(12) United States Patent
Birnbaum et al.

(10) Patent No.: US 9,895,767 B2
(45) Date of Patent: Feb. 20, 2018

(54) LASER INDUCED EXTRA-PLANAR ELICITATION

(75) Inventors: Andrew J Birnbaum, Washington, DC (US); Alberto Piqué, Crofton, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 1994 days.

(21) Appl. No.: 13/104,129

(22) Filed: May 10, 2011

(65) Prior Publication Data

US 2012/0285937 A1 Nov. 15, 2012

(51) Int. Cl.
| | | |
|---|---|---|
| *B23K 26/00* | (2014.01) | |
| *B23K 26/34* | (2014.01) | |
| *B23K 26/32* | (2014.01) | |
| *B23K 26/324* | (2014.01) | |
| *B23K 26/364* | (2014.01) | |
| *B23K 26/0622* | (2014.01) | |
| *B23K 26/40* | (2014.01) | |
| *B23K 103/12* | (2006.01) | |
| *B23K 101/34* | (2006.01) | |

(Continued)

(52) U.S. Cl.
CPC ...... *B23K 26/0063* (2013.01); *B23K 26/0006* (2013.01); *B23K 26/0093* (2013.01); *B23K 26/0624* (2015.10); *B23K 26/32* (2013.01); *B23K 26/324* (2013.01); *B23K 26/34* (2013.01); *B23K 26/364* (2015.10); *B23K 26/40* (2013.01); *B23K 2201/34* (2013.01); *B23K 2203/08* (2013.01); *B23K 2203/12* (2013.01); *B23K 2203/172* (2015.10); *B23K 2203/50* (2015.10)

(58) Field of Classification Search
CPC ............................ B23K 26/18; B23K 26/0069
USPC ............ 219/121.69, 121.85, 121.76, 121.84; 29/832, 840; 427/372.2, 384, 532, 554
See application file for complete search history.

(56) References Cited

U.S. PATENT DOCUMENTS

| | | | |
|---|---|---|---|
| 6,177,151 B1 | 1/2001 | Chrisey et al. | |
| 6,197,408 B1 * | 3/2001 | Kanbara et al. | 428/209 |

(Continued)

OTHER PUBLICATIONS

Arora et al., "Membrane folding to achieve three-dimensional nanostructures: Nanopatterned silicon nitride folded with stressed chromium hinges" Appl. Phys. Lett., 88, 053108 (2006).

(Continued)

*Primary Examiner* — Thien S Tran
(74) *Attorney, Agent, or Firm* — US Naval Research Laboratory; Joseph T. Grunkemeyer

(57) ABSTRACT

In a method of controlled laser deformation, a substrate is provided that is transparent to the laser energy. At least a portion of the substrate is coated with a release layer that absorbs the laser energy. A component to be deformed is attached to the release layer opposed to the substrate. A source of laser energy is directed through the substrate and into a portion of the release layer, which vaporizes the portion of the release layer by absorption of the laser energy, and releases a portion of the component from the substrate. This deforms the portion of the component away from the substrate by the vaporization of the release layer such that at least one edge of the component is no longer in contact with the release layer or substrate, and leaving a second portion of the component still attached to non-vaporized release layer.

12 Claims, 5 Drawing Sheets

(51) Int. Cl.
  *B23K 103/08*    (2006.01)
  *B23K 103/00*    (2006.01)
  *B23K 103/16*    (2006.01)

(56) References Cited

U.S. PATENT DOCUMENTS

| | | |
|---|---|---|
| 6,805,918 B2 | 10/2004 | Auyeung et al. |
| 6,986,199 B2 | 1/2006 | Arnold et al. |
| 7,001,467 B2 | 2/2006 | Pique et al. |
| 2007/0004171 A1* | 1/2007 | Arana et al. ............ 438/455 |
| 2007/0039933 A1* | 2/2007 | Cheng .................... 219/121.69 |
| 2007/0187674 A1* | 8/2007 | Nakamura et al. ............ 257/40 |
| 2008/0257871 A1* | 10/2008 | Leiser et al. ............ 219/121.67 |
| 2009/0217517 A1 | 9/2009 | Pique et al. |

OTHER PUBLICATIONS

Birnbaum et al., "Laser Induced Extraplanar Propulsion for Three-Dimensional Micro-Fabrication", Applied Physics Letters, 98, 134101 (2011).

Dearden et al., "Some recent developnents in two- and three-dimendional laser forming for 'macro' and 'micro' applications" J. Opt. A: Pure Appl. Opt. 5 (2003) S8-S15.

Edwards et al., "Laser Peen Forming for 2D Shaping and Micro Adjustment" International Congress on Applications of Lasers and Electro-Optics, Orlando, FL (2007).

Li et al., "Multiple-pulse laser dynamic forming of metallic thin films for microscale three dimensional shapes" J. Appl. Phys., 108, 013107 (2010).

Pique et al., U.S. Appl. No. 13/005,610, filed Jan. 13, 2011.

\* cited by examiner

LASER INDUCED EXTRA-PLANAR ELICITATION

TECHNICAL FIELD

The present disclosure is generally related to the formation of three-dimensional micro- and nano-scale components by laser induced extra-planar elicitation (LIEPE).

DESCRIPTION OF RELATED ART

The ability to produce true 3D components at the micro- and nano-scale has been the focus of increasing interest in the last decade due to the potential for creating a wide class of structures, devices, and components for an array of applications. However, most efforts to date have relied on traditional silicon based photolithographic techniques which were originally developed for the micro-electronics industry decades ago suffer from a number of inherent limitations. Despite these limitations, a number of methods relying on these techniques have in fact been demonstrated. These methods utilize a number of underlying physical mechanisms including: residual mechanical stress, surface tension driven assembly, electro-active polymer actuation, thermal/shape memory, and magnetic or electro-static forces. For example, Arora et al. (*Appl. Phys. Lett.* 88 (2006) 053108 (all publications and patent documents referred to throughout this nonprovisional application are incorporated herein by reference)) deposit chromium thin films and lithographically pattern them into "hinges", which tether one end of the moveable structure to the bulk substrate. When the other end of the structure is released, the residual stress in the Cr film causes out-of-plane bending.

In addition to the lithographic techniques described above, there have also been some studies on utilizing non-lithographic methods, predominantly laser-based for producing desirable deformation. These include the so-called Laser Forming (LF) (Dearden et al., *Journal of Optics A: Pure and Appl. Optics*, 5 (2003) S8-S15), Laser Peen Forming (LPF) (Edwards et al., International Congress on Applications of Lasers and Electro-Optics, Orlando, Fla. (2007)) and Laser Dynamic Forming (LDF) (Li et al., *J. of Appl. Phys.* 108, 013107 (2010)) processes. The former, LF has been used to produce bending deformation in micro-scale components via thermal means by locally heating a portion of a pre-released micro-cantilever. However, due to the thermal nature of the process, extremely undesirable residual stress distributions as well as detrimental material effects result due to rapid cooling. LPF however is a nearly non-thermal laser based process which relies on producing a mechanical shockwave and inducing local a residual stress for generating bending deformation in metal thin foils. Although the drawbacks of thermal processing are eliminated with LPF, the process is not suitable for exceedingly thin structures (such as thin film components) as it relies on generating a through-thickness stress gradient which is extremely difficult to accomplish in sub-micron thickness films without catastrophically damaging them. Finally, the forming/extrusion of thick aluminum films have been demonstrated via the LDF process. However, LDF requires the fabrication of a 3D mold for extrusion and is not compatible with wafer based architectures.

BRIEF SUMMARY

Disclosed herein is a method of laser deformation. A substrate is provided that is transparent to the laser energy. At least a portion of the substrate is coated with a release layer that absorbs the laser energy. A component to be deformed is attached to the release layer opposed to the substrate. A source of laser energy is directed through the substrate and into a portion of the release layer, which vaporizes the portion of the release layer by absorption of the laser energy, and releases a portion of the component from the substrate. Pressure from the vaporization of the release layer deforms the portion of the component away from the substrate, such that at least one edge of the component is no longer in contact with the release layer or substrate, and leaving a second portion of the component still attached to the non-vaporized release layer.

BRIEF DESCRIPTION OF THE DRAWINGS

A more complete appreciation of the invention will be readily obtained by reference to the following Description of the Example Embodiments and the accompanying drawings.

DETAILED DESCRIPTION OF EXAMPLE EMBODIMENTS

Figure 1:
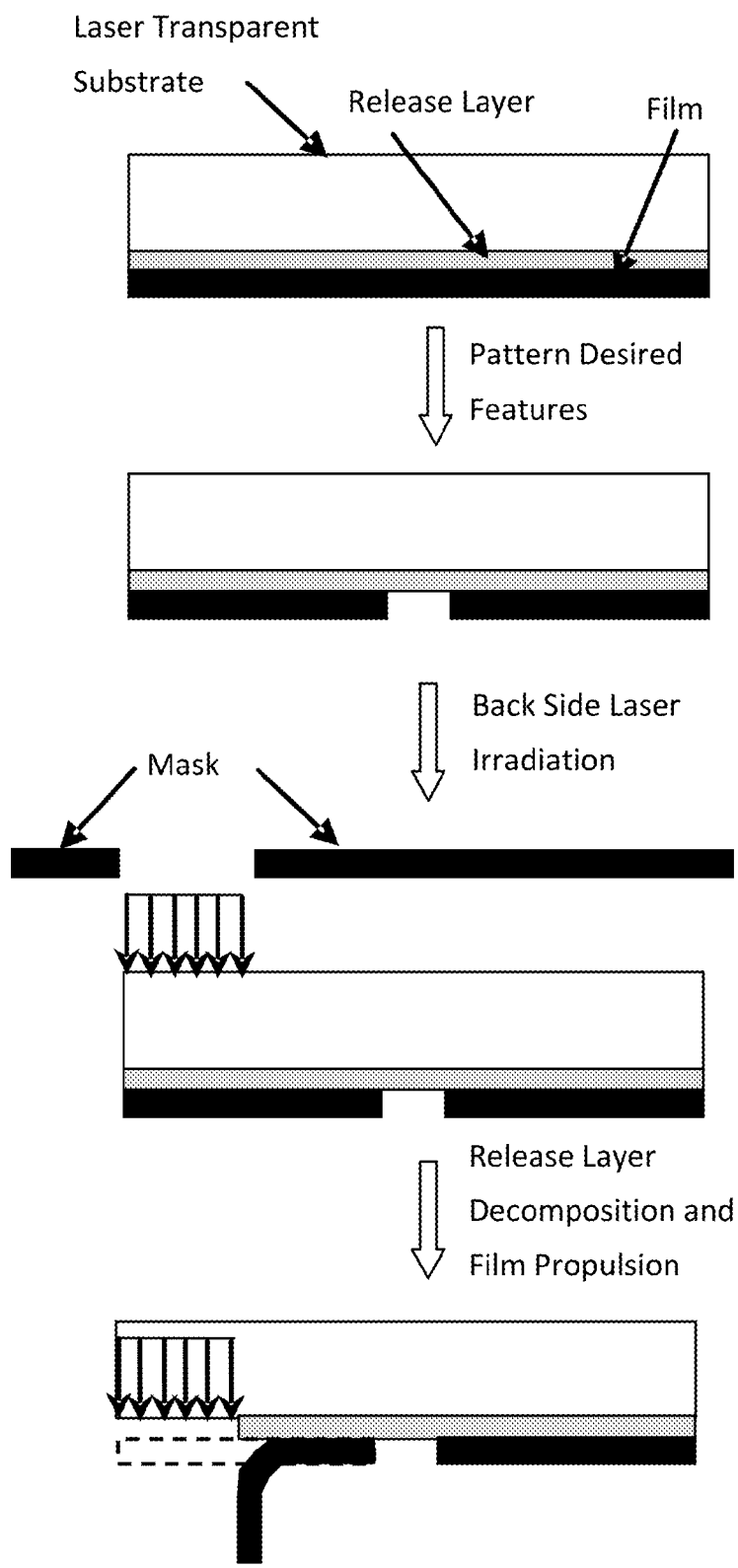
FIG. 1 shows a schematic representation of LIEPE process steps

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted so as to not obscure the present disclosure with unnecessary detail.

Disclosed is a process that enables the elicitation of 2D micro/nano-scale active and/or passive thin film components out of the substrate plane upon which these components have been pre-patterned. The introduction of a non-lithographic technique which takes advantage of the flexibility offered by LF, LPF and LDF while avoiding their drawbacks, as well as the ability to process at the milli-, micro-, and nano-scales while also avoiding the limitations of traditional lithographic techniques is realized via the use of a modified laser-direct write (LDW) technique. This process enables the formation of true 3D configurable objects at small scales on non-silicon based platforms.

This process requires a means for patterning the 2D structures, which may be accomplished via photolithographic techniques, laser micro-machining, contact transfer, stamping, or embossing. The pre-patterned features are then partially irradiated by a laser source resulting in their being propelled out of the plane of definition thus generating a 3D structure. In addition to producing 3D thin film configurations, the process may also be used to raise entire pre-patterned or pre-positioned devices out of the plane as well by mounting these devices on the films being raised.

The method disclosed herein, which may be referred to as "Laser Induced Extra-Planar Elicitation" (LIEPE), can be capable of transforming 2D planar micro/nano-scale structures into complex 3D components while preserving intrinsic material properties and/or device performance. Furthermore, the process is highly controllable and due to the underlying process mechanisms, should be compatible with any ductile thin film material. Applications for this process include the fabrication of individual devices and components or arrays of devices for optical, electronic and microelectro mechanical systems.

The method also represents a significant departure from the lithographic paradigm in that traditional lithography is not capable of generating folded 3D structures from metals, alloys and other materials that are incompatible with standard semiconductor processing techniques. In addition, the flexibility of the process affords the ability to selectively actuate desired elements as opposed to batch processing which requires that all components must be activated or not simultaneously, though LIEPE can also be realized for parallel processing capabilities if desired. This ability lends itself greatly for the fabrication of novel metamaterial geometries and structures. Finally, all previous methods also rely on producing intrinsic stresses for generating out-of-plane deformation while LIEPE is a direct deformation method. That is it provides direct local propulsion to individually selected features without having to alter the stress state of the component itself.

LIEPE is a process whereby the precursor shape with the desired geometry is first generated either via lithography or non-lithographic means, and then a selectable portion of the precursor is propelled out of the substrate plane via local laser decomposition of a laser absorbent release layer. Since the remaining part of the precursor remains attached to the substrate, it is possible to generate anchored 3D patterns of various dimensions and out-of-plane orientations by controlling the intensity and shape of the laser pulse. FIG. 1 provides a schematic description of the process which proceeds as follows:

1. The release layer and material to be deformed are deposited on a laser transparent substrate.
2. The desired geometry is defined via lithographic techniques, laser patterning, or laser micro-machining.
3. A portion of the pre-patterned feature (that being deformed) is aligned to the incident laser beam and then irradiated from the back side of the substrate. The non-irradiated portion of the structure serves to anchor the feature to the substrate.
4. The laser energy is absorbed by the release layer resulting in rapid decomposition or vaporization resulting in the release of the film and generation of a localized rapid pressure rise. The local pressure acts to propel the now released film out of the substrate plane.

As opposed to previously developed methods for introducing extra-planar deformation where the intrinsic stress state of the material is used as a means for producing global deformation, LIEPE relies on direct propulsion of the structures. This is advantageous as it allows for the out-of-plane bending to be relatively independent of the stress state of the material, thus avoiding undesirable stress distributions and concentrations. Furthermore, the process is essentially non-thermal as it only requires a single nanosecond laser pulse for operation greatly reducing effects from thermal cycling or sustained high temperatures eliminating any deleterious material effects that can occur. Use of a highly laser absorbent release layer also allows for the use of relatively low laser intensities further reducing any thermal effects and also acting to "gently" raise the film out of the plane. This is demonstrated by the ability to deform films as thin as 100 nm without tearing or delaminating the anchored or free portions of the structures.

The substrate can be any substrate that is sufficiently transparent to the laser. A quartz substrate is suitable for many types of lasers. A release layer that absorbs the laser is disposed on the substrate. If any other materials are between the release layer and the substrate, they must also be transparent to the laser and are considered to be part of the substrate. The release layer absorbs enough laser energy that it is vaporized or ablated by the absorption. The vaporization occurs substantially only at the site impinged by the laser. Suitable release layer materials include, but are not limited to, indium tin oxide.

The component may be any flat structure desired to be deformed into a three dimensional structure. The three dimensional structure may be, for example, an electrical device, a mechanical device, or an antenna. The component may be made of any ductile or bendable material with properties conducive to the function of the three dimensional structure. The component may comprise, for example, a layer of copper, other pure metals, metal alloys, or a polymer.

The component is disposed on the release on the opposite side from the substrate. The component is attached to the release layer in that it does not fall off during ordinary handling. The attachment may be by any means including, but not limited to, intermolecular forces, van der Waals forces, covalent bonds, ionic bonds, or an adhesive. If any material is between the release layer and the component, it is considered to be a part of the release layer or component.

Any means of disposing the component on the release layer may be used, including lithographic and non-lithographic processes. It may be created by an additive or subtractive method. The component may be any thickness that results in a ductile component. A suitable thickness range includes, but is not limited to, 50 nm to 1 µm.

The component may be the top layer on the substrate. Optionally, another material may be disposed on the component or exposed release layer. This top material may not prevent the deformation of the component. The deformation must produce an edge of the component not in contact with the substrate or release layer. Such a top material may be considered to be part of the component.

Any laser that passes through the substrate and is absorbed by the release layer may be used, including but not limited to pulsed lasers. The laser may generate pulses with widths of, for example, 100 femtoseconds to 100 nanoseconds long with wavelengths ranging from, for example, 200 nm to 3.5 microns. The laser may be pulsed multiple times and directed at different components in order to deform multiple components on one substrate. Different components may be targeted by, for example, moving the substrate. Alternatively, a single laser pulse may target multiple components by use of a mask. The size of deformed area may be on the order of nanometers to millimeters, and may be of any shape.

The vaporization of the release layer must be sufficient to deform the component. It is not necessary the entirety of the laser-absorbing portion of the release layer be vaporized. The degree of bending of the component may be controlled by controlling the amount of laser energy directed at the release layer. More energy may produce a more propulsive evaporation, causing more bending The deformation causes at least one original edge of the component to be lifted from the substrate and release layer along with a portion of the area of the component. The number of released edges will depend on the shape of the component. A rectangular component will typically produce three released edges. This differs from merely producing a bulge in the component.

Figure 2:
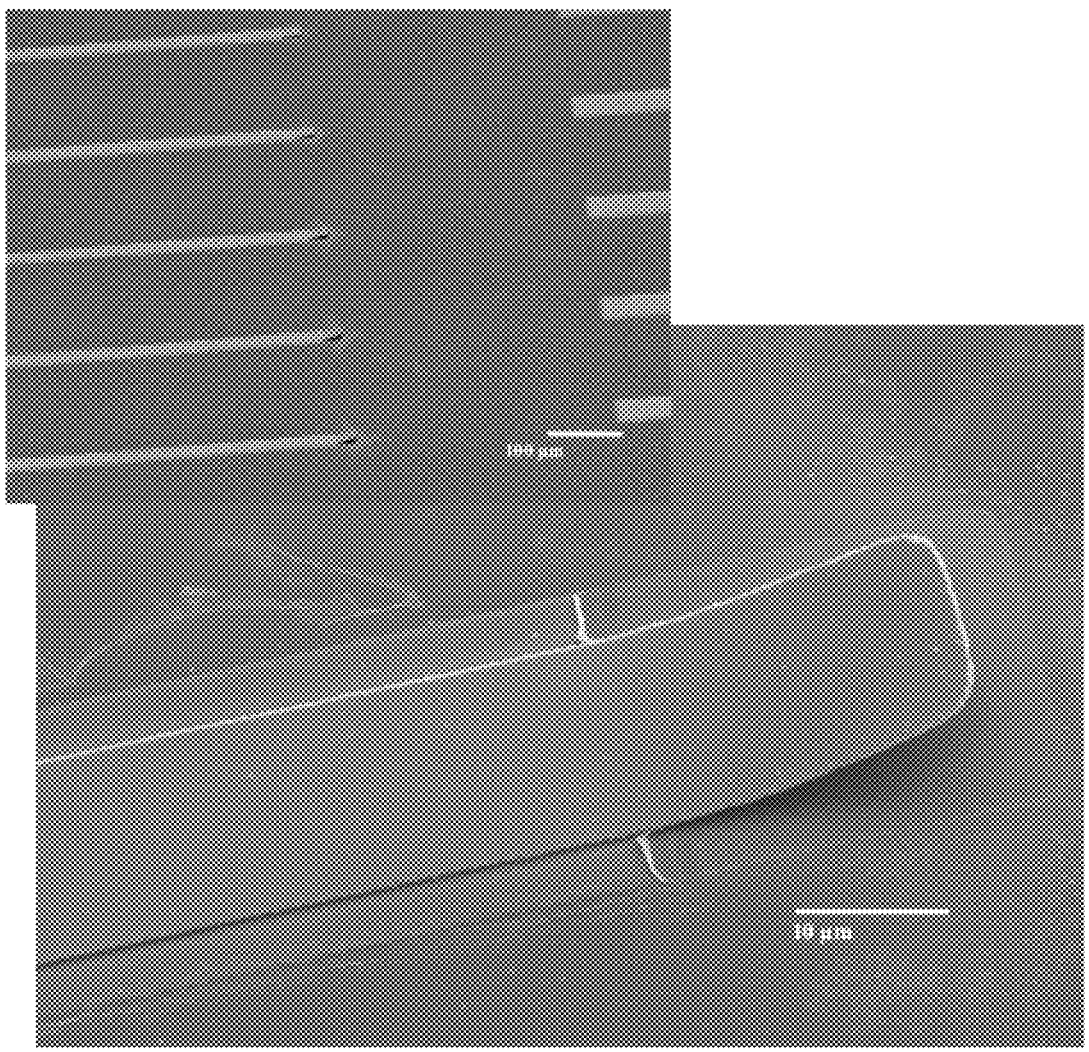
FIG. 2 shows an electron micrograph of laser elicited Cu film with an ITO release layer (inset: several Cu strips bent at varying angles via laser fluence control).
Figure 3:
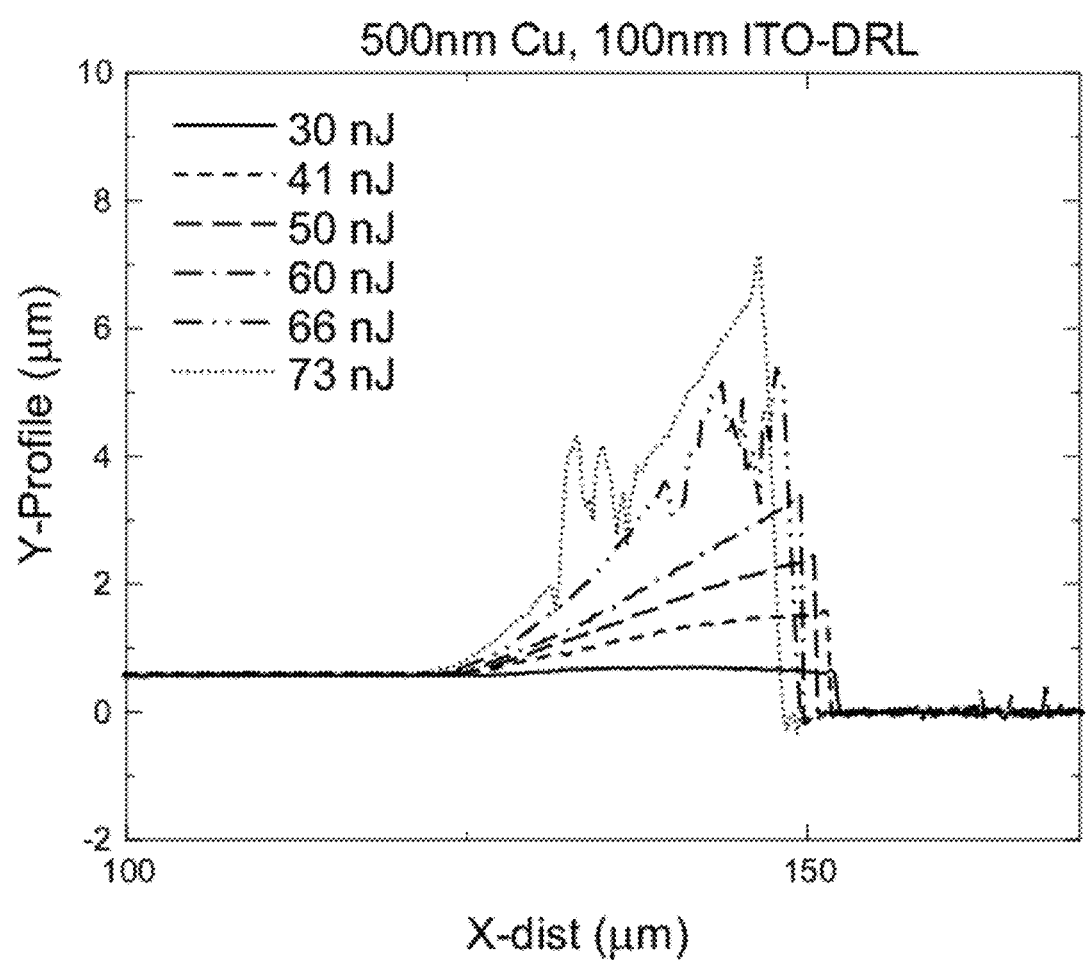
FIG. 3 shows profiles of laser bent structures obtained via laser confocal microscopy. Note the monotonic increase in bending as laser intensity is increased.
Figure 4:
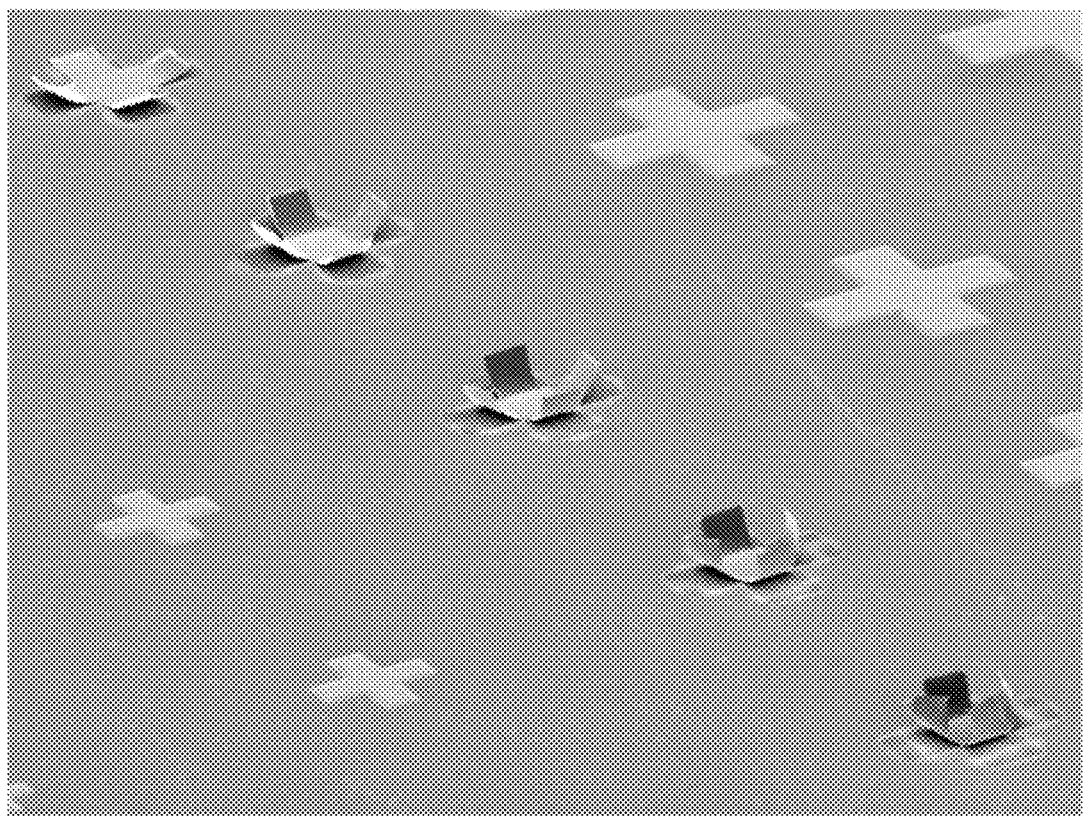
FIG. 4 shows an electron micrograph of a series of laser bent micro-enclosures.
Figure 5:
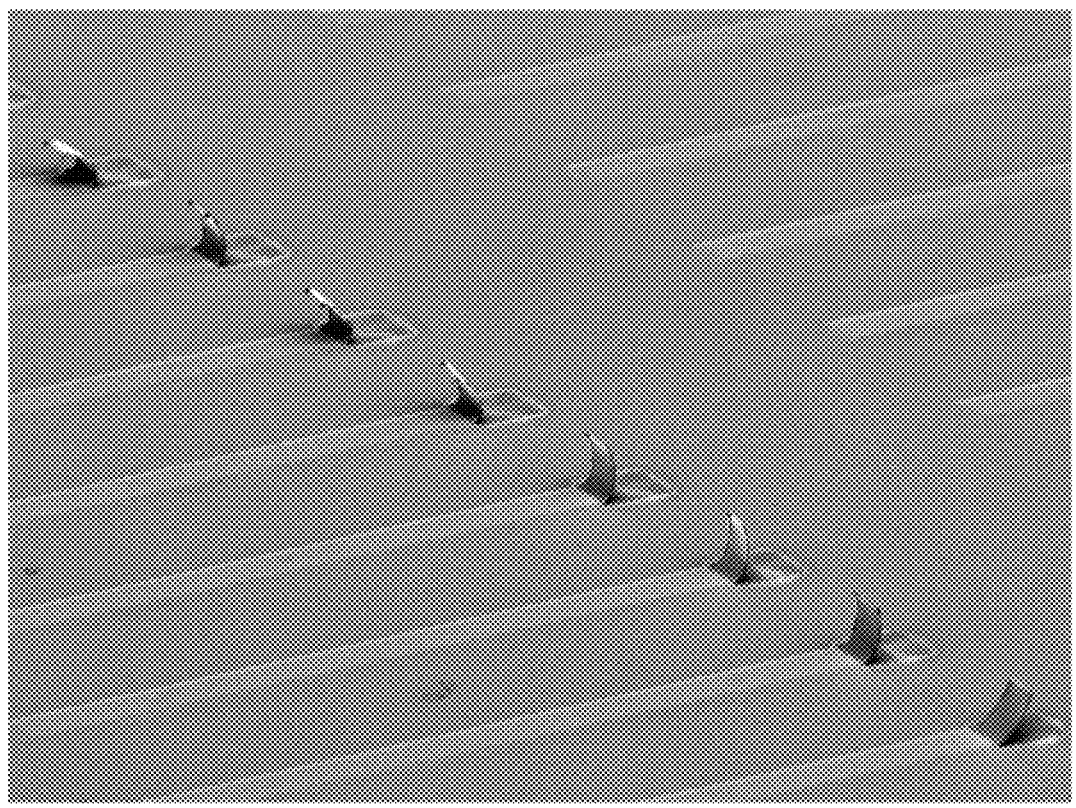
FIG. 5 shows an electron micrograph of a series of laser elicited structures with bending angles varying from 45 to 180 degrees.

FIG. 2 is an electron micrograph of a copper film (t=500 nm) that has been patterned into 20×300 µm rectangular strips and then propelled out of plane via LIEPE. The Cu film rests on an indium tin-oxide (ITO) release layer on a quartz substrate. The inset shows several Cu strips that have been bent out of plane at various angles. FIG. 3 shows profiles obtained by laser scanning confocal microscopy from Cu strips that have been bent at varying angles out of the plane by varying the laser intensity incident on the release layer. FIG. 3 thus demonstrates that the process is controllable, and may be used to non-lithographically select the desired feature and control the subsequent extra-planar deformation. Furthermore, the micrographs also demonstrate that the process is gentle enough to maintain well defined edges and faces while keeping the anchored portion completely intact. Though the demonstration given here is for a Cu film, the process is compatible with eliciting any ductile material. Furthermore, the choice of release layer is also not limited to ITO, but is compatible with laser absorbent materials (for a given wavelength) with low thresholds for decomposition or vaporization. FIGS. 4 and 5 are micrographs of another example using LIEPE where FIG. 4 is a micrograph of micro-enclosure generated by eliciting four independent sides of the structure. FIG. 5 again reveals the ability to continuously control the bending angle by varying the laser fluence from zero to 180 degrees.

Figure 6:
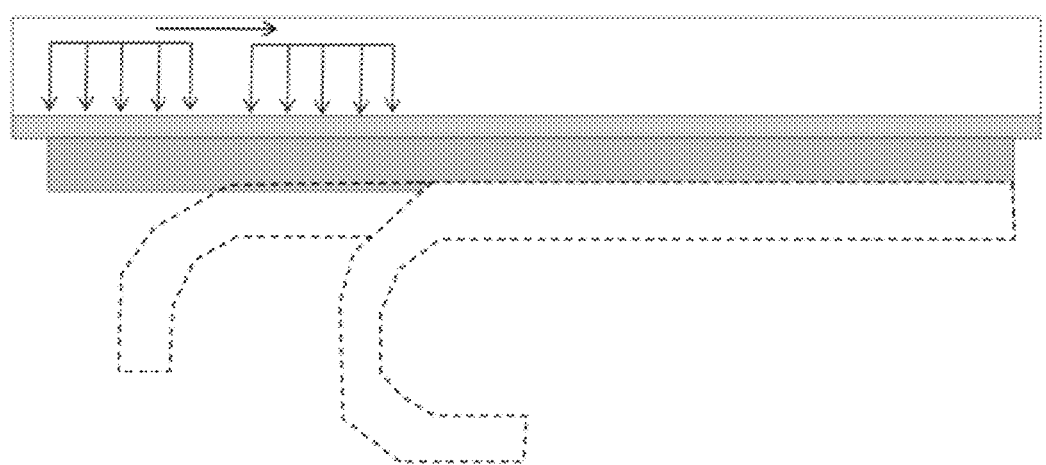
FIG. 6 shows a schematic representation of step-wise, sequential LIEPE for 3D faceted micro-structures

Finally, in addition to producing a single fold, the process may also be implemented in a stepwise fashion by sequentially firing the laser source as it is scanned or translated along the length of the structure. This represents a new way for fabricating faceted 3D structures for application in optical systems as well as potential for producing micro-antennas and resonators. FIG. 6 shows this process schematically.

Due to its non-lithographic nature, LIEPE is suitable for producing controllable out-of-plane deformation at micro and nano-scales in a completely flexible and controllable non-contact manner. Its characteristics provide a means for fabricating a wide array of opto-electronic and micro electro-mechanical systems.

Due to the non-contact nature of the process, there is also great potential for fabricating complex 3D structures on bendable/flexible/stretchable substrates that are also compatible with scaled up, low cost manufacturing process such as "roll-to-roll" manufacturing. This compatibility is ideal for realizing the integration of small scale devices for flexible electronics applications.

Obviously, many modifications and variations are possible in light of the above teachings. It is therefore to be understood that the claimed subject matter may be practiced otherwise than as specifically described. Any reference to claim elements in the singular, e.g., using the articles "a," "an," "the," or "said" is not construed as limiting the element to the singular.

What is claimed is:

1. A method comprising:
    providing a source of laser energy;
    providing a substrate;
        wherein the substrate is transparent to the laser energy;
        wherein at least a portion of the substrate is coated with a release layer that absorbs the laser energy;
        wherein a component to be deformed is attached to the release layer opposed to the substrate; and
        wherein the component has at least one edge in contact with the release layer or substrate;
    directing the laser energy through the substrate and into a portion of the release layer;
    vaporizing the portion of the release layer by absorption of the laser energy, releasing a portion of the component from the substrate; and
    deforming the portion of the component away from the substrate by the vaporization of the release layer such that the at least one edge of the component is no longer in contact with the release layer or substrate, and leaving a second portion of the component still attached to non-vaporized release layer.

2. The method of claim 1, wherein the source of laser energy generates laser pulses with widths of 100 femtoseconds to 100 nanoseconds long.

3. The method of claim 1, wherein the source of laser energy generates laser pulses with wavelengths ranging from 200 nm to 3.5 microns.

4. The method of claim 1, wherein the substrate is a quartz substrate.

5. The method of claim 1, wherein the release layer comprises indium tin oxide.

6. The method of claim 1, wherein the component comprises a layer of copper, a pure metal, a metal alloy, or a polymer.

7. The method of claim 6, wherein the layer is 50 nm to 1 μm thick.

8. The method of claim 1, further comprising:
    forming the component on the release layer by a lithographic process.

9. The method of claim 1, further comprising:
    forming the component on the release layer by a non-lithographic process.

10. The method of claim 1, wherein directing, vaporizing, and bending are performed sequentially more than one time in different locations to bend a single component more than one time.

11. The method of claim 1, wherein the substrate comprises a plurality of components, and further comprising:
    performing the directing, vaporizing, and bending more than one time to bend more than one of the components.

12. The method of claim 1;
    wherein the substrate comprises a plurality of components; and
    wherein the laser energy is directed through a mask before the substrate such that more than one component is simultaneously deformed.

* * * * *